United States Patent [19]
Yodo et al.

[11] Patent Number: 5,524,157
[45] Date of Patent: Jun. 4, 1996

[54] OPTICAL FIBER COUPLER AND A METHOD OF PRODUCING THE SAME

[75] Inventors: Shigehito Yodo; Toru Sato; Akio Hasemi, all of Tokyo, Japan

[73] Assignee: The Furukawa Electric Co., Ltd., Tokyo, Japan

[21] Appl. No.: 296,755

[22] Filed: Aug. 26, 1994

[51] Int. Cl.⁶ ........................ G02B 6/26
[52] U.S. Cl. .................. 385/42; 385/39; 385/95
[58] Field of Search .................. 385/42, 95, 96, 385/97, 98, 39, 41

[56]    References Cited

U.S. PATENT DOCUMENTS 5,129,019  7/1992  Robberg et al. .............. 385/42
5,360,464  11/1994  Yamauchi et al. ............ 385/98 X

FOREIGN PATENT DOCUMENTS 60-107606  6/1985  Japan .
2-127604   5/1990  Japan .

Primary Examiner—John D. Lee
Assistant Examiner—Phan T. H. Palmer
Attorney, Agent, or Firm—Frishauf, Holtz, Goodman, Langer & Chick

[57]    ABSTRACT

An optical fiber coupler in which portions in the lengthwise direction of a plurality of optical fibers whose surface is coated with a carbon film are welded to each other and extended to form a connected portion, and the connected portion is not coated with a carbon film. This coupler is manufactured by arranging in parallel a plurality of optical fibers whose surface is coated with a carbon film so that the portions which are to form a connected portion are brought into contact with each other, and by heating the portions which are to form a connected portion in an atmosphere containing oxygen to join these portions by welding while extending the optical fibers. This optical fiber coupler has high hydrogen resistance and static fatigue strength. Also, the use of this coupler provides a small-sized system as a whole without degrading the optical characteristics.

6 Claims, 7 Drawing Sheets

OPTICAL FIBER COUPLER AND A METHOD OF PRODUCING THE SAME

BACKGROUND OF THE INVENTION

The present invention relates to an optical fiber coupler and a method of producing the same and, more particularly to an optical fiber coupler which is manufactured using an optical fiber whose surface is coated with carbon and has high hydrogen resistance and high static fatigue strength, and a method of producing the same.

An optical communication system incorporates optical fiber couplers which have a function to branch and join light having a single wavelength or to separate and combine light having plural wavelengths.

Recently, optical fiber couplers have been used in a wide variety of applications including submarine optical cable communication and automotive intercommunication systems. As the applications expand, optical fiber couplers are demanded more strongly than before to have higher hydrogen resistance and higher static fatigue strength.

A conventional optical fiber coupler A, which has been used in optical communication systems, has a construction as shown in FIG. 1, in which at a predetermined location in the lengthwise direction of two optical fibers 1 and 2, the coatings 1a and 2a formed of, for example, ultraviolet-curing resin on the outer periphery of respective clads are removed, the exposed clad portions are welded and extended by heating them by means of, for example, a micro torch, and the cores of the optical fibers 1 and 2 are approached to each other to the extent that evanescent bonding can be performed in order to form a connected portion 3.

As shown in FIG. 2, this optical fiber coupler A is contained in an enclosure 5 with the connected portion 3 being fixed onto a reinforcing plate 4 consisting of, for example, quartz with an adhesive, and the enclosure 5 is filled with, for example, a resin to prevent moisture from entering the connected portion 3 from the outside for practical use.

In the optical fiber coupler A, part of the light inputted to the core of, for example, optical fiber 1, branches off to the core of the optical fiber 2 in a predetermined branching ratio at the connected portion 3. Thus, each light is transmitted and outputted through respective cores of the optical fibers 1 and 2.

Such an optical fiber coupler has the following great problems in practical use: The hydrogen resistance of the connected portion 3 should be increased so that a high mechanical strength is maintained for a long period of time and high reliability is ensured. Also, the static fatigue strength of the optical fiber itself should be increased so that the design strength is kept for a long period of time and the portion extending from the enclosure can be bent to a small radius of curvature for use. In particular, the high static fatigue strength is a useful feature for miniaturizing the system size including the optical fiber coupler.

A variety of methods have so far been used to manufacture optical fiber couplers. For example, Japanese Unexamined Patent Publication No. 60-107606 discloses one method as described below.

With this method, a metal coated optical fiber whose clad surface is coated with a metal such as Al or Ni is used as an optical fiber.

First, a desired length of metal coating layer of the metal coated optical fiber is dissolved and removed by using, for example, solution of hydrochloric acid to expose the clad surface, and then the metal coat removal portion is rinsed. Two metal coated optical fibers thus treated are put in parallel with their metal coat removal portions being in contact with each other. Then, two metal coat removal portions are welded by heating by means of, for example, oxygen-hydrogen flame to form a connected portion. In this process, two metal coated optical fibers may be pulled so that the metal coat removal portion is extended to an extent that a desired diameter can be obtained.

In this process, the branching ratio of light at the formed connected portion can be set appropriately by performing the aforementioned welding work while inputting light from one metal coated optical fiber and measuring the light outputted from the other metal coated optical fiber.

However, the optical fiber coupler manufactured by this method has the following problems: First, the metal coating layer must be pickled and then rinsed to form the metal coat removal portion as a preliminary process before the formation of connected portion. In this process, the clad (glassy material) inevitably comes into contact with water. As a result, the strength of the optical fiber at the metal coat removal portion is reduced, so that it is difficult to form a connected portion with a high strength. Although it is advantageous from the industrial viewpoint that the processes of pickling and rinsing are omitted and two optical fibers are directly welded and extended, this is impossible with the above method.

Japanese Unexamined Patent Publication No. 2-127604 discloses another method for manufacturing an optical fiber coupler as described below.

With this method, part of the coating of an optical fiber is removed, and two optical fibers whose clad is exposed are brought into contact with each other. While light is inputted from one optical fiber and the light outputted from the other optical fiber is measured, the portion in contact is heated and welded, and at the same time, the optical fiber is extended in the optical axis direction. When the measured light exhibits a predetermined branching ratio, the melting/extending operation is stopped to form an extended portion (connected portion). After that, the extended portion is coated with a carbon film by means of, for example, incompletely burned gas of acetylene.

However, this method has a problem in that the carbon film formed at the extended portion functions as an absorbing layer of light. Specifically, the extended portion, which is formed so as to have a predetermined branching ratio in the welding/extending operation, exhibits another branching ratio when the carbon film is formed on it.

In both of the techniques disclosed by Japanese Unexamined Patent Publication No. 60-107606 and Japanese Unexamined Patent Publication No. 2-127604, if the clad surface of glassy material is damaged in forming the connected portion, it is necessary to perform flaming or hydrofluoric acid polishing so as to ensure smooth welding of clads.

OBJECTS AND SUMMARY OF THE INVENTION

An object of the present invention is to provide an optical fiber coupler which is manufactured using a carbon coated optical fiber whose surface is coated with carbon.

Another object of the present invention is to provide an optical fiber coupler which has high optical characteristic and reliability and also high hydrogen resistance and static fatigue strength, and can be miniaturized as a whole.

A still another object of the present invention is to provide an optical fiber coupler in which a connected portion of the optical fiber is formed easily, so that the coupler can be manufactured at smaller cost than before.

To achieve the above objects, the present invention provides an optical fiber coupler in which portions in the lengthwise direction of a plurality of optical fibers whose surface is coated with a carbon film are welded to other and extended to form a connected portion, and the connected portion is not coated with a carbon film.

Also, the present invention provides a method of producing an optical fiber coupler, which includes the steps of putting in parallel a plurality of optical fibers whose surface is coated with a carbon film so that the portions which are to form a connected portion are brought into contact with each other; and heating the portions which are to form a connected portion in an atmosphere containing oxygen to join these portions by welding while extending.

DETAILED DESCRIPTION OF THE INVENTION

An optical fiber coupler of the present invention is manufactured by using an optical fiber whose surface is coated with carbon (hereinafter called a carbon coated optical fiber).

Figure 3:
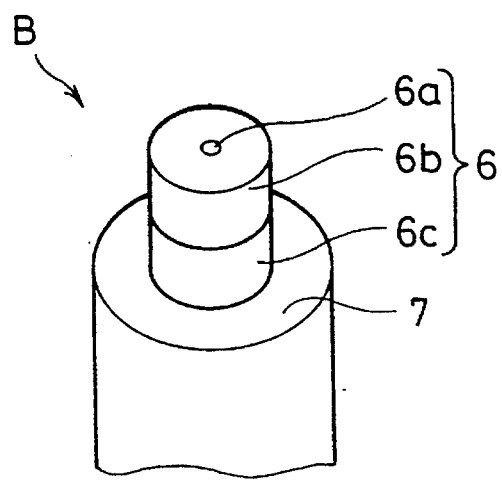
FIG. 3 is a perspective view showing a construction of a carbon coated optical fiber.

For this carbon coated optical fiber, as shown in FIG. 3, a bare fiber 6 is formed by coating the surface of an optical fiber comprising a core 6a and a clad 6b with a carbon film 6c with a thickness of about 500 to 1000 angstroms. On the outside of the carbon film 6c, a protective layer 7, which is formed of an ultraviolet-curing resin and has a thickness of about 62.5 µm, is formed.

Figure 4:
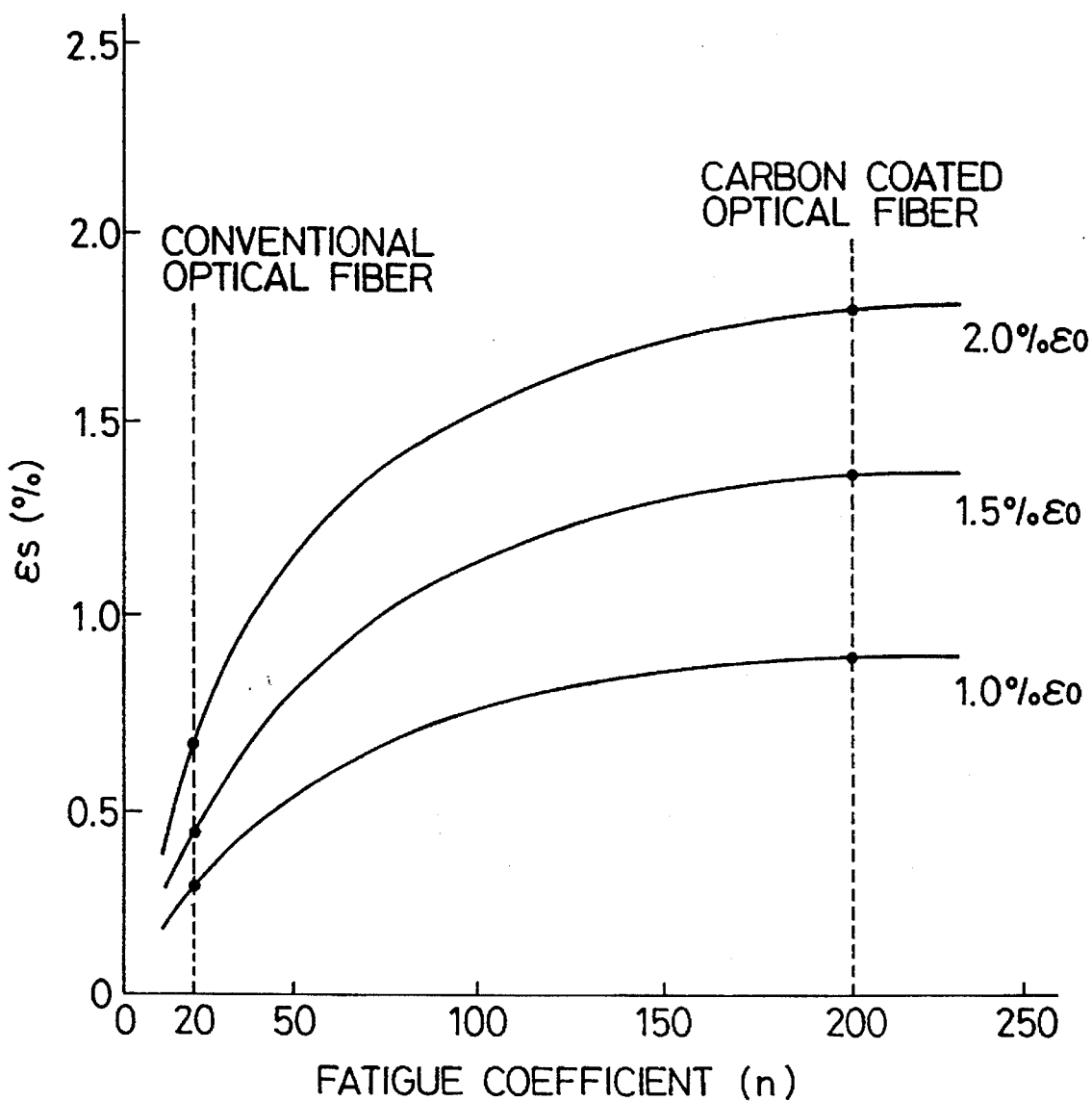
FIG. 4 is a graph showing the relationship between the fatigue coefficient and the working load strain of optical fiber.

This carbon coated optical fiber of FIG. 3 has a very high static fatigue strength. The relationship between the fatigue coefficient n value and the working load strain was investigated for a carbon coated optical fiber having a carbon film 6c with a thickness of 500 angstroms and a protective layer 7 which is formed of an ultraviolet-curing resin and has a thickness of 62.5 µm and a conventional optical fiber having a protective layer of the same specification but no carbon film. The result is shown in FIG. 4. In the figure, $\epsilon_s$ denotes the practical load strain in the case where the optical fiber is used for 20 years, and $\epsilon_o$ denotes the proof test strain.

As seen from FIG. 4, the carbon coated optical fiber has a fatigue coefficient n value not less than 200, and can be practically used for a long period of time even if a load stress close to 90% of the stress in the proof test is applied.

Figure 5:
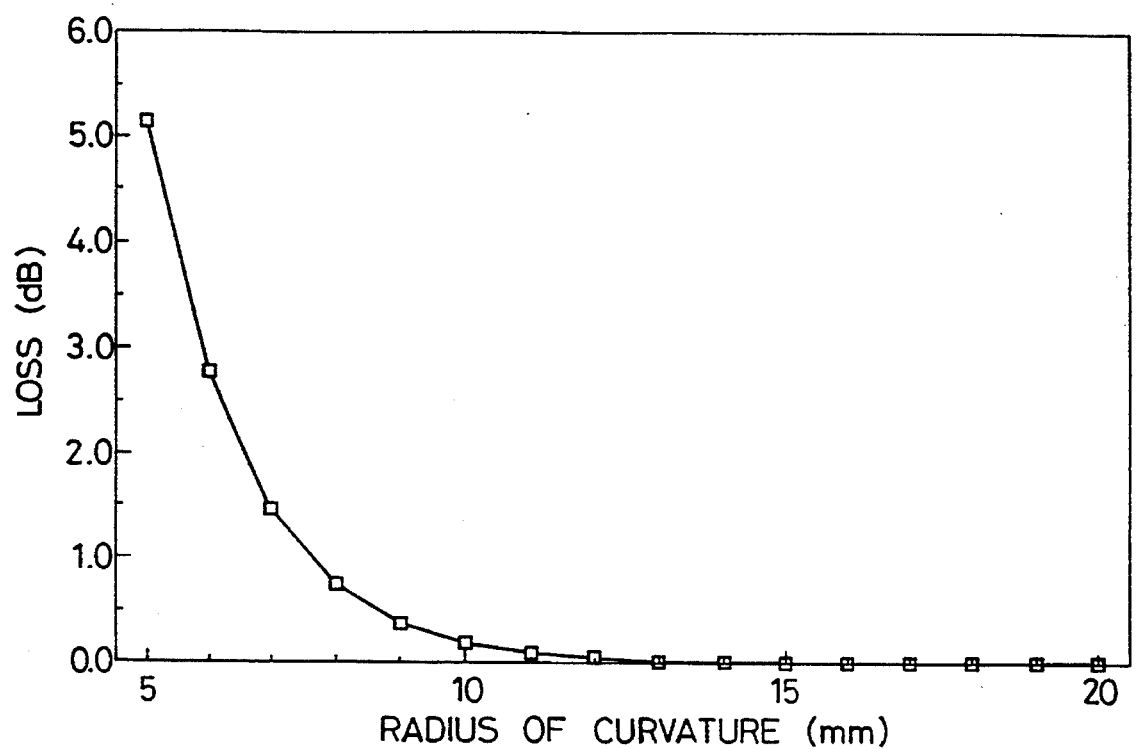
FIG. 5 is a graph showing the relationship between the radius of curvature of a loop and the loss in the case where an optical fiber is bent into a loop form.

When the carbon coated optical fiber of proof test strain of 1% is bent to some radius of curvature, the relationship between the radius of curvature of the loop and the loss is shown by a curve shown in FIG. 5. Incidentally, the wavelength of the used light is 1.31 µm.

As seen from FIG. 5, this carbon coated optical fiber can be bent to a radius of curvature as small as about 13 mm without causing the increase in loss for the light of a wavelength of 1.31 µm.

This carbon coated optical fiber can be manufactured for a conventional optical fiber by forming a bare fiber by coating the surface thereof with a carbon film with a desired thickness using the thermal CVD method or other methods, by applying liquid ultraviolet-curing resin of a desired thickness to the surface of the bare fiber, and by radiating ultraviolet rays to it.

The method for manufacturing a 2-input, 2-output optical fiber coupler of the present invention will be described with respect to the drawings.

Figure 6:
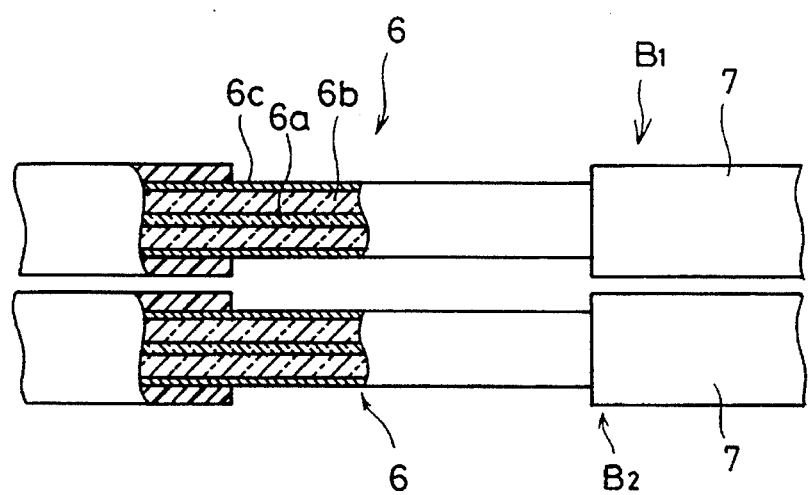
FIG. 6 is a partially cutaway side view showing a condition in which two carbon coated optical fibers whose protective layers are removed are arranged in parallel with each other.

First, part of the protective layer 7, 7 of each of two carbon coated optical fibers $B_1$ and $B_2$ is removed using, for example, a stripper so that the bare fiber 6, 6 is exposed. Then, the carbon coated optical fibers $B_1$ and $B_2$ are arranged in parallel with each other so that the positions of the exposed portions of the bare fibers agree with each other in the lengthwise direction as shown in FIG. 6.

Figure 7:
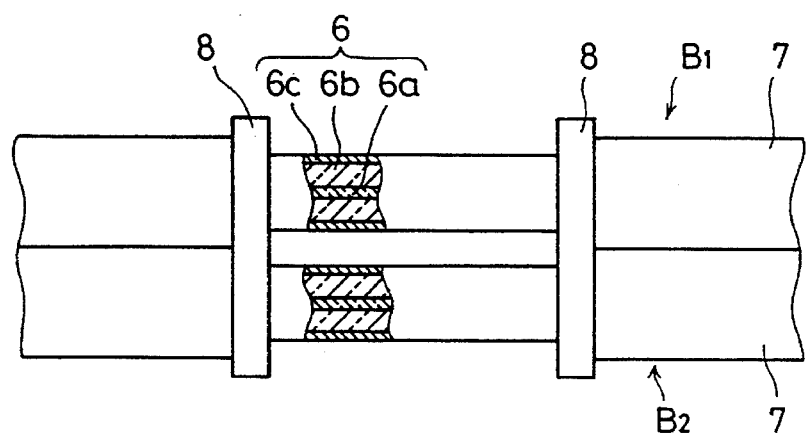
FIG. 7 is a partially cutaway side view showing a condition in which both ends of the bare fibers are clamped.

Afterwards, both ends of the bare fibers 6 and 6 are clamped with clamps 8 and 8 to fix the bare fibers 6 and 6 as shown in FIG. 7.

Figure 8:
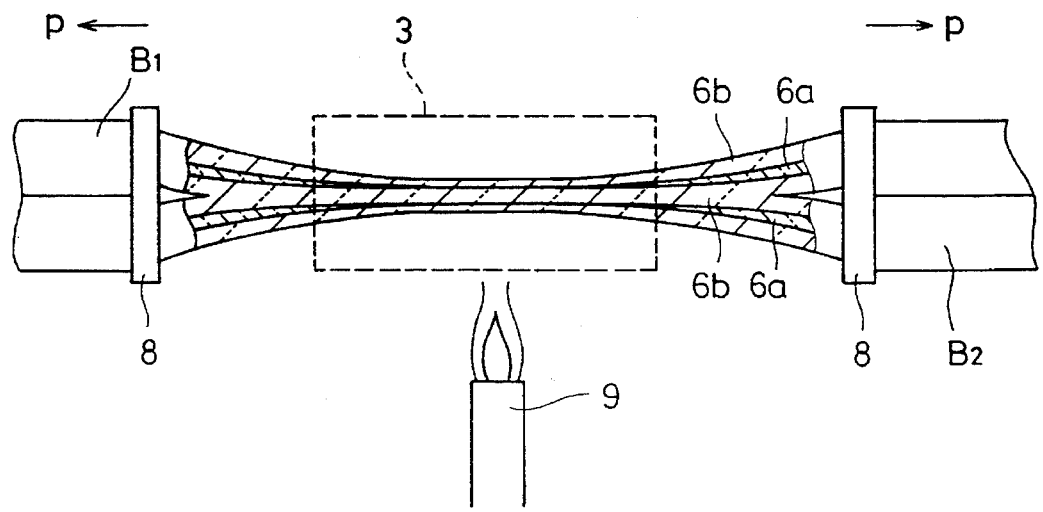
FIG. 8 is a partially cutaway side view showing a condition in which a connected portion is formed by a welding/extending operation.

As shown in FIG. 8, the portions of the bare fibers 6 and 6 in FIG. 7 are heated by heating means 9 such as a micro torch, and the entire fiber arrangement is pulled in the directions indicated by arrows p and p to extend the portions of the bare fibers. At this time, light is inputted from one end of the carbon coated optical fiber $B_1$, and the outputted light is measured at one end of the carbon coated optical fiber $B_2$.

The heating work must be done in an atmosphere containing oxygen. The heating means 9 is not limited to the micro torch shown in FIG. 8, and an ordinary burner, a micro heater, heating means using arc discharge, laser radiation, and other means may be used.

In this process, the carbon film 6c, which is present on the outer surface of the bare fiber 6, 6 is oxidized by oxygen and removed automatically from the outer surface of bare fiber by vaporization. The respective clads 6b and 6b of the bare fibers 6 and 6 are welded into one unit, and that portion is extended, thereby decreasing the diameter thereof. Together with the decrease in diameter of clad, the diameter of the core of each optical fiber also decreases and the cores get nearer to each other.

When the outputted light measured at the carbon coated optical fiber $B_2$ becomes a light exhibiting a predetermined branching ratio, the aforementioned heating operation is stopped. As a result, a connected portion 3 having a predetermined branching ratio is formed. Thus, an optical fiber coupler, which has no carbon film at the connected portion 3 and in which other portions including the portion clamped by clamps 8 and 8 are coated with a carbon film, can be obtained.

For the optical fiber coupler of the present invention, the carbon film with which the outer surface of the clad is coated is vaporized and removed by the heating operation in forming the connected portion, so that the connected portion is formed at the same time that the carbon film is removed. In other words, unlike the prior art disclosed in Japanese Unexamined Patent Publication No. 60-107606, it is unnecessary to remove the metal coating layer on the clad surface before the formation of the connected portion as a separate process, so that the number of processes can be decreased as compared with the prior art. Unlike the prior art, because there is no pickling and rinsing processes, the decrease in strength of optical fiber is prevented, so that the connected portion becomes highly hydrogen resistant and static fatigue strength increases.

Further, unlike the prior art disclosed in Japanese Unexamined Patent Publication No. 2-127604, the branching ratio set in forming the connected portion is unchanged because the connected portion is not coated with a carbon film.

Also, because the optical fiber used in manufacturing the coupler is a carbon coated optical fiber, the surface of clad is not damaged even, for example, when the protective layer is removed or when both ends of bare fibers are clamped with clamps, so that the reliability of the obtained coupler is increased. Even if the clad surface is damaged, the growth of damage is restricted by the action of the carbon film at other portions, so that the damage is not expanded.

EXAMPLE 1

Two carbon coated optical fibers were prepared. The optical fiber has a protective layer formed by an ultraviolet-curing resin, has a total diameter of 250 μm, has a surface of 125 μm diameter quartz optical fiber coated with a carbon film with a thickness of about 500 angstroms, and has proof test strain of 1%.

The protective layer of each carbon coated optical fiber was removed over a length of 28 mm to expose the bare fiber. Then, two carbon coated optical fibers were put in parallel, and both ends of bare fibers were clamped with clamps. The welding/extending operation was performed by heating the bare fiber portion with a micro torch for about 15 seconds in the atmosphere containing oxygen while applying a tensile force. At this time, the change in branching ratio was investigated.

When the branching ratio became 1:1, the welding/extending operation was stopped. As shown in FIG. 8, an optical fiber coupler having a connected portion 3 with a length of 13 mm was obtained.

Figure 1:
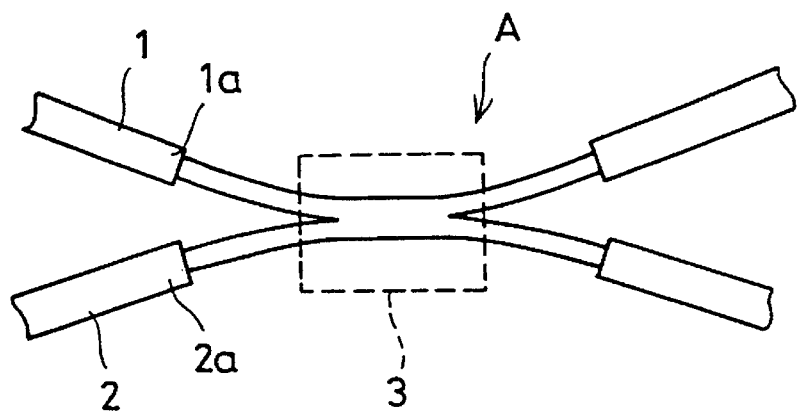
FIG. 1 is a schematic view of a conventional optical fiber coupler.
Figure 2:
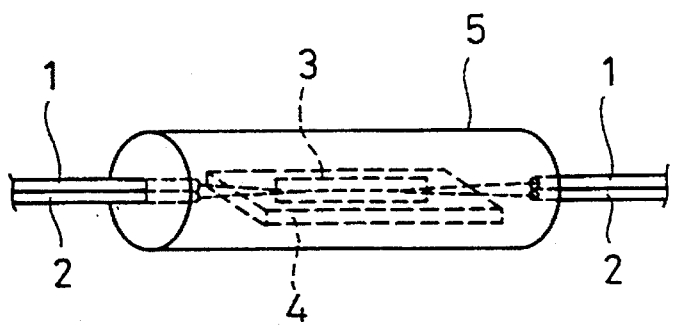
FIG. 2 is a perspective view showing the condition in which an optical fiber coupler is housed in an enclosure.

The connected portion 3 of this optical fiber coupler was bonded onto a quartz plate 4 with an adhesive, as described in FIG. 2, and housed in a cylinder 5 with a length of 45 mm and a diameter of 3.5 mm. Then, the cylinder 5 is filled with a resin to produce a 2-input, 2-output coupler.

A reliability evaluation test of the following specification was conducted with the carbon coated optical fiber extending to the outside of the cylinder 5 being looped to a diameter of 30 mm on both input and output sides.

Heat cycle test: Twenty heat cycles were applied to the coupler, each cycle consisting of heating and cooling of −40° to 80° C. for 8 hours, and the change in insertion loss with time was measured.

Wet heating test: The coupler was allowed to stand in an atmosphere with a temperature of 80° C. and a relative humidity of 90% for 100 hours, and the change in insertion loss with time was measured.

Vibration test: Vibration of an amplitude of 1.5 mm, having a cycle time described hereinafter, was applied for 3 hours from three directions of the cylinder: lengthwise direction, width direction, and vertical direction. The cycle time for which the frequency is gradually increased from 10 Hz to 55 Hz and then decreased to 10 Hz was one minute. The change in insertion loss was measured.

Impact test: An impact was applied using a load of 100 G for 6 m.sec from two directions of the cylinder: lengthwise direction and vertical direction. The change in insertion loss was measured.

The results of the above tests are given in Table 1.

TABLE 1

| Evaluation item | Result |
| --- | --- |
| Heat cycle time | < ±0.2 dB |
| Wet heating test | < ±0.2 dB |
| Vibration test | < ±0.2 dB |
| Impact test | No change |

As seen from the results given in Table 1, the coupler of the present invention has high hydrogen resistance and static fatigue strength, and the change in the insertion loss is very small even if a loop of a diameter of 30 mm is formed. Therefore, the coupler of the present invention can be miniaturized as a whole.

EXAMPLE 2

Figure 9:
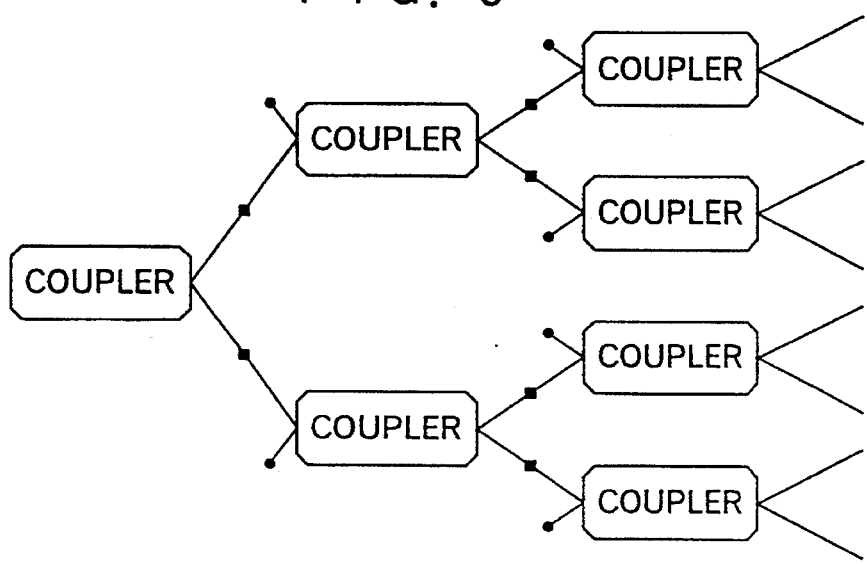
FIG. 9 is a schematic view showing a 1×8 star coupler of the present invention.

A 1-input, 8-output (1×8) star coupler as shown in FIG. 9 was manufactured by using seven 2-input, 2-output (2×2) couplers manufactured in Example 1 and by fusion-connecting respective optical fibers extending from the connected portions into a tree shape.

This 1×8 star coupler was bonded to a quartz plate and housed in an enclosure. Total dimensions were 62 mm in width, 90 mm in length, and 8.5 mm in thickness. For comparison, a 1×8 star coupler was manufactured by using single mode optical fibers which have been used so far. The total dimensions of this star coupler were 90 mm in width, 150 mm in length, and 8.5 mm in thickness. Thus, the 1×8 star coupler of the present invention has an about 60% less volume as compared with the conventional coupler, achieving miniaturization.

The optical characteristic of this 1×8 star coupler specimen was measured in the temperature range of −40° to 75° C. by using light of a wavelength of 1310±25 nm. The results are given in Table 2.

TABLE 2

| Evaluation item | Result |
| --- | --- |
| Insertion loss | <11.3 dB |
| Homogeneity | <±1.5 dB |
| Return loss | >50 dB |
| Polarized wave variation | <0.4 dB |

Figure 10:
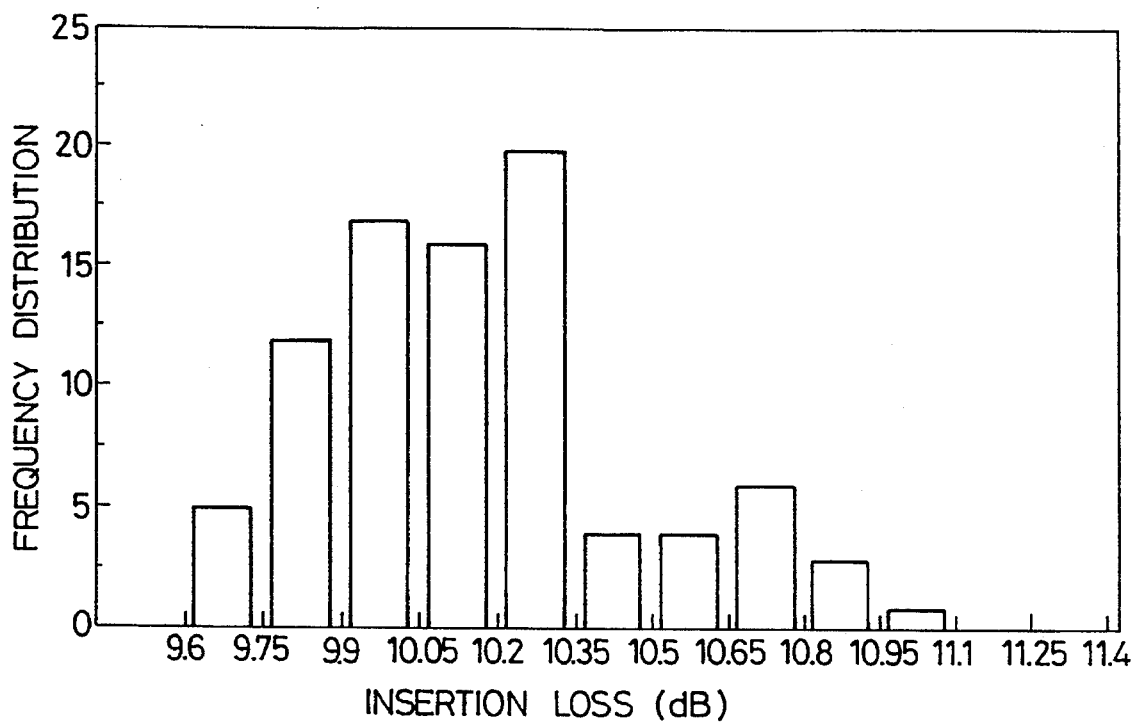
FIG. 10 is a graph showing a frequency distribution of insertion loss.
Figure 11:
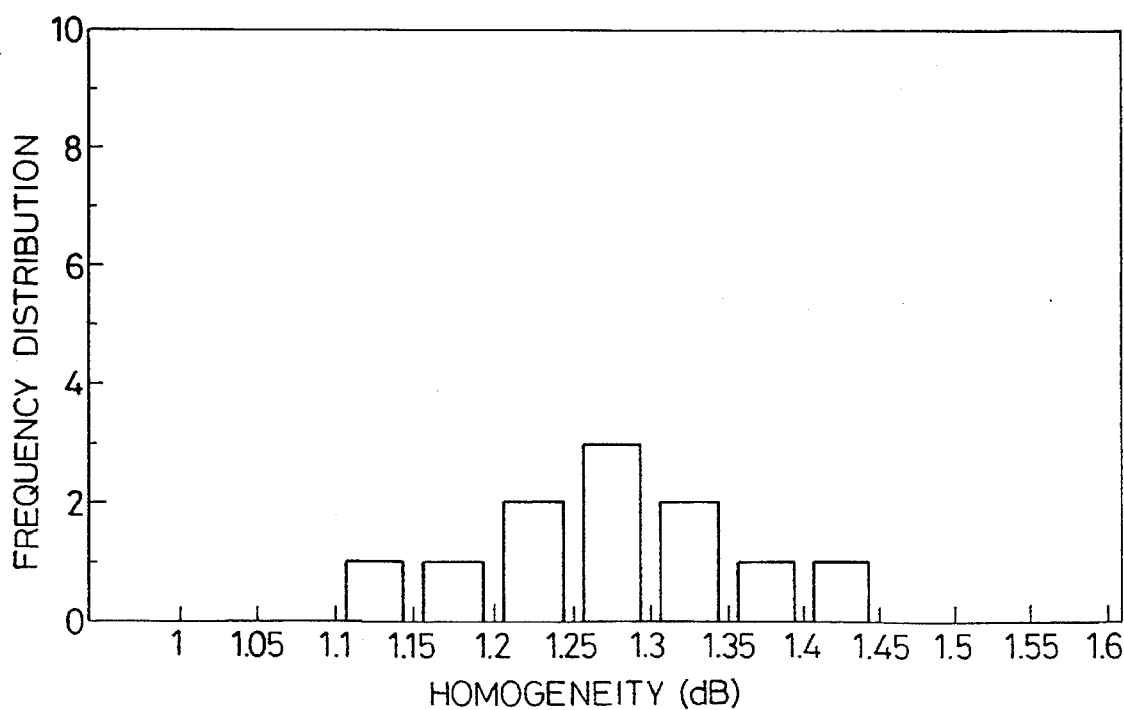
FIG. 11 is a graph showing a frequency distribution of homogeneity.

FIG. 10 gives the frequency distribution of insertion loss, and FIG. 11 the frequency distribution of homogeneity between the specimens. The number of ports in measuring the frequency distribution of insertion is 88, and the number of specimens in measuring the frequency distribution of homogeneity is 11.

The average value of insertion loss is 10.17 dB, and the average value of homogeneity is 1.28 dB, which means satisfactory optical characteristic.

A reliability evaluation test of the following specification was conducted on this 1×8 star coupler.

Heat cycle test: Forty-two heat cycles were applied to the coupler, each cycle consisting of heating and cooling of −40° to 85° C. for 8 hours, and the change in insertion loss with time was measured.

Wet heating test: The coupler was allowed to stand in an atmosphere with a temperature of 60° C. and a relative humidity of 90% for 350 hours, and the change in insertion loss with time was measured.

Vibration test: Vibration of an amplitude of 1.5 mm, having a cycle time described hereinafter, was applied for 3 hours from three directions of the enclosure: lengthwise direction, width direction, and vertical direction. The cycle time for which the frequency is gradually increased from 10 Hz to 55 Hz and then decreased to 10 Hz was one minute. The change in insertion loss was measured.

High temperature retention test: The coupler was allowed to stand in the atmosphere with a temperature of 85° C. for 350 hours, and the change in insertion loss with time was measured.

Figure 12:
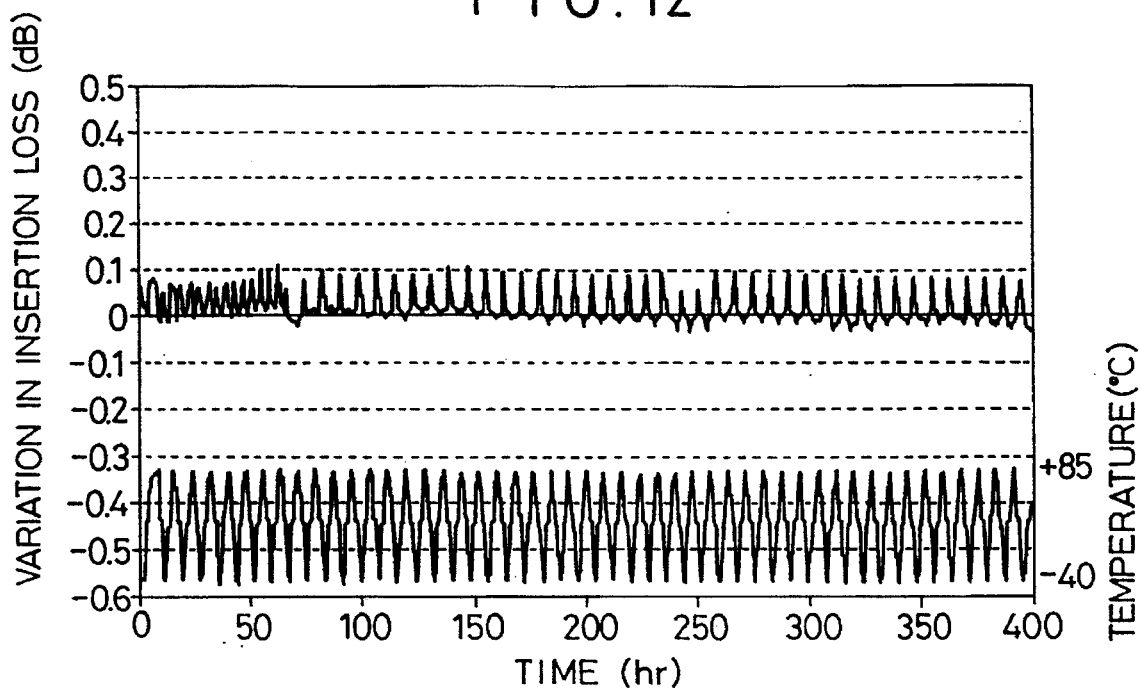
FIG. 12 is a graph showing variation in insertion loss in a heat cycle test.
Figure 13:
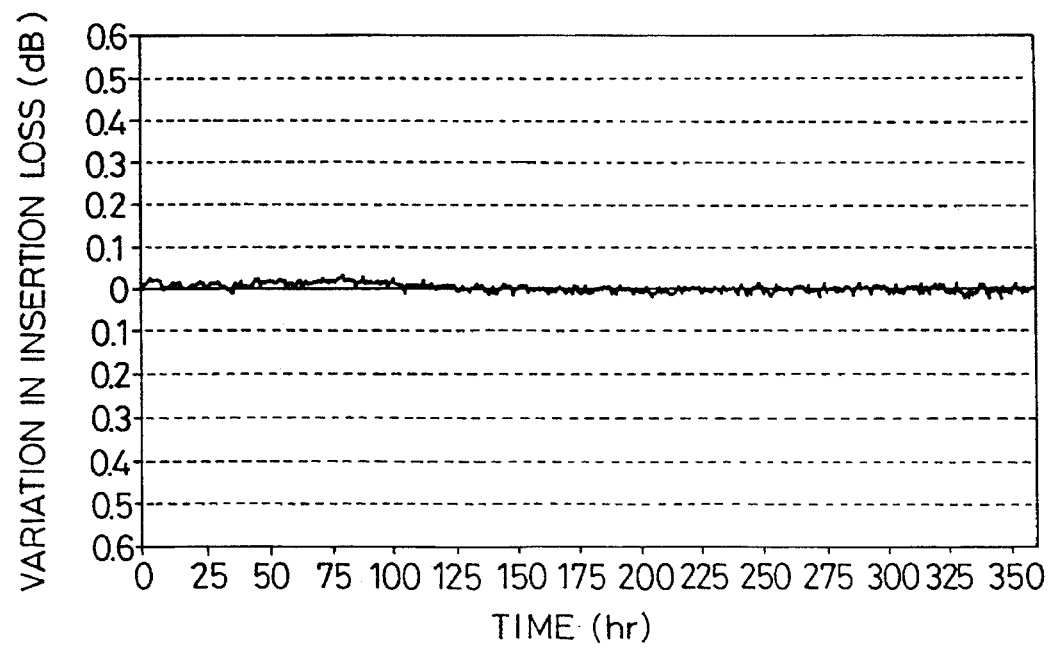
FIG. 13 is a graph showing a variation in insertion loss in a wet heating test.
Figure 14:
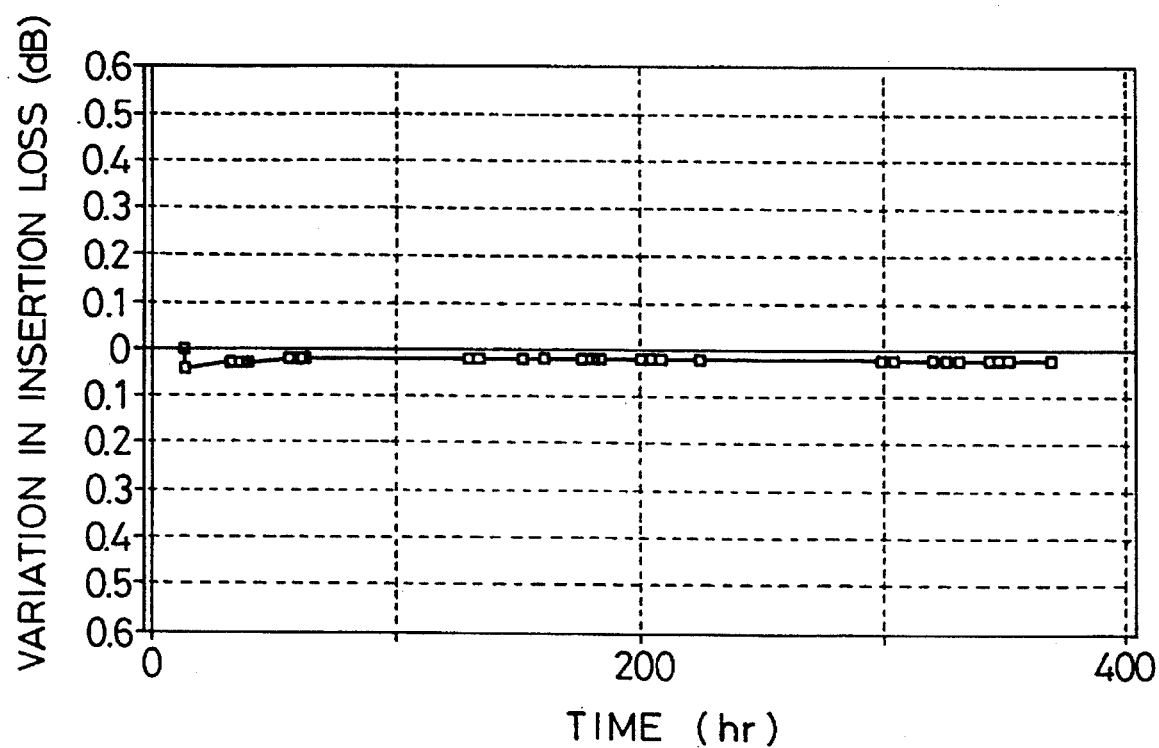
FIG. 14 is a graph showing a variation in insertion loss in a high temperature retention test.

The results are shown in FIGS. 12, 13, and 14 for the heat cycle test, the wet heating test, and the high temperature retention test, respectively.

As seen from FIG. 12, the change in insertion loss in the process of the heat cycle test is as small as ±0.3 dB or less, which indicates that this coupler is invulnerable to heat cycles. Also, as seen from FIG. 13, the change in insertion loss in the process of the wet heating test is not larger than ±0.3 dB, which means this coupler has high moisture resistance.

Further, as seen from FIG. 14, the insertion loss of this coupler is not higher than ±0.3 dB even if this coupler is subjected to high temperatures for a long period of time, which means that this coupler has high heat resistance.

The loss variation in the vibration test is within ±0.1 dB, which means this coupler has satisfactory vibration resistance.

What is claimed is:

1. An optical fiber coupler in which,
    portions in the lengthwise direction of a plurality of optical fibers whose surface is coated with a carbon film are welded to each other and extended to form a connected portion; and
    said connected portion is not thereafter coated with a carbon film.

2. The optical fiber coupler of claim 1, wherein said optical fibers in said connected portions are arranged substantially in parallel with each other before formation of said connected portion.

3. The optical fiber coupler of claim 2, wherein portions of said optical fibers other than said connected portion remain coated by said carbon film.

4. The optical fiber coupler of claim 1, wherein said welded optical fibers are welded to each other by heating contacting portions of said optical fibers in an atmosphere containing oxygen and by stretching the heated portions during said heating, to thereby remove said carbon film at said connected portions and to weld said optical fibers together at said connected portion.

5. The optical fiber coupler of claim 1, wherein said optical fibers are clamped together by respective clamping means on opposite sides of said connected portion during said heating of said contacting portions of said optical fibers.

6. The optical fiber coupler of claim 5, wherein said optical fibers are pulled apart at said respective clamping means during said heating so as to extend said optical fibers during said heating thereof.

* * * * *